2,846,462

PROCESS FOR PRODUCING ISOPHTHALONITRILE AND TEREPHTHALONITRILE

David James Hadley, Epsom Downs, England, assignor to The Distillers Company Limited, Edinburgh, Scotland, a British company No Drawing. Application November 29, 1956
Serial No. 624,963

Claims priority, application Great Britain
December 17, 1955

11 Claims. (Cl. 260—465)

The present invention relates to the production of aromatic nitriles by the reaction of alkyl-substituted aromatic compounds with ammonia and molecular oxygen and in particular to the production of terephthalonitrile and isophthalonitrile from para- and meta-xylenes.

The production of terephthalonitrile and isophthalonitrile by the catalysed reaction of para- and meta-xylene with ammonia and molecular oxygen at elevated temperatures in the vapour phase has already been proposed, and in my copending United States application Serial No. 610,901 are described processes for the production of terephthalonitrile and isophthalonitrile in high yield and with good efficiency of conversion from para-xylene and meta-xylene respectively.

It is an object of the present invention to provide a process for the production of mixtures of isophthalonitrile and terephthalonitrile by the reaction of mixtures of meta- and para-xylene with ammonia and molecular oxygen.

It is a further object of the present invention to provide a process for the separation of isophthalonitrile or terephthalonitrile from mixtures obtained by the reaction of meta- and para-xylene with ammonia and molecular oxygen.

According to the present invention, the process for the production of isophthalonitrile and terephthalonitrile comprises contacting at an elevated temperature a mixture in the vapour phase of m-xylene, p-xylene, ammonia and molecular oxygen with a catalyst comprising vanadium or molybdenum oxides to produce a mixture containing isophthalonitrile and terephthalonitrile, and isolating the isophthalonitrile or the terephthalonitrile from the mixture of nitriles by extraction with an organic solvent in which one of the nitriles is more soluble than the other.

The conversion of the mixture of meta- and para-xylene to isophthalonitrile and terephthalonitrile may be carried out over a moderately wide range of reaction conditions. It is preferred to use a vanadium oxide catalyst, and the catalysts are preferably deposited on a carrier such as heat-treated activated alumina. Other vanadium or molybdenum compounds, or the metals themselves may be used, and these will be converted to the oxides at the start of the reaction. While the optimum reaction temperatures will vary according to the particular catalysts being employed and other operating conditions, in general temperatures between 300° and 450° C. and preferably between 330° C. and 420° C., have been found to be suitable. The conversion of the meta- and para-xylenes to the mixed nitriles may be carried out by the known method of vapour phase catalysis. The catalyst may be a stationary or moving bed, and in view of the high heat output and the necessity of keeping good control of the temperature, a fluidised bed method may be of special advantage.

In a preferred embodiment of the invention a mixture of m-xylene, p-xylene, ammonia and molecular oxygen is contacted in the vapour phase with a catalyst comprising vanadium oxide deposited on activated alumina, the latter having been heated prior to deposition to a temperature in the range of 1000° C. to 1500° C., to produce a mixture containing isophthalonitrile and terephthalonitrile, and the isophthalonitrile or the terephthalonitrile isolated from the mixture of nitrile by extraction with an organic solvent in which one of the nitriles is more soluble than the other. In the preparation of the catalyst in accordance with this preferred embodiment, the activated alumina support is prepared by heating in air to a temperature of between 1000° C. and 1500° C. for not less than about 3 hours. The heat treatment should be carried out before the catalytic agent has been deposited on the alumina. The catalyst may be prepared, for instance, by evaporating a solution of vanadyl oxalate on to 10–18 mesh (British Standard Testing Sieves) activated alumina, which has previously been heated at about 1350° C. for about 20–24 hours, and then allowed to cool. The mixture is evaporated to dryness at about 100° C. with frequent stirring and is then heated in a stream of air at a temperature of 350° C. to 400° C. The proportion of vanadium oxide in the catalyst may be varied quite considerably, for instance proportions between 0.1 and 10% may be used, and preferably about 5% based on the weight of the total catalyst. In order to facilitate heat dissipation in the highly exothermic reaction, it is advantageous to mix with the granules of active catalyst granules of inert diluting material such as brick, pumice, Carborundum and the like. This provides a convenient means for regulating the heat output per unit volume of reactor.

I have found that with this preferred catalyst yields of over 70% of isophthalonitrile and/or terephthalonitrile can be obtained without difficulty, but that the temperature of heat treatment of the catalyst support, contact time and the reaction temperature must be carefully chosen to achieve the higher yields. The selection of the exact combination of reaction conditions to achieve a yield of at least 70% of isophthalonitrile and/or terephthalonitrile, in accordance with the preferred embodiment described above, will be understood by one skilled in the art. Thus the higher the temperature of heat treatment of the catalyst support the less active will be the resulting catalyst, i. e. the most active catalysts are produced by heating the alumina at about 1000° C. and the least active catalysts are produced by heating at about 1500° C. Such catalysts have a surface area of between about 15 and ½ sq. metres per gram. Heat treatment temperatures above 1500° C. are not desirable for practical reasons. With the more active catalysts it is necessary to use the less severe reaction conditions of contact time and reaction temperature in the ranges set out above, and vice versa. Furthermore, with a catalyst of medium activity, for instance one in which the support has been heated at 1250° or 1300° C., the contact time and reaction temperature are similarly adjusted to give the highest yields, the longer contact times being used with the lower reaction temperatures in the ranges set out above, and vice versa. Preferably the catalyst heat treatment and reaction temperatures should be chosen to give a contact time of the order of 0.5 to 5 seconds, although longer contact times may be used, for instance up to 20 seconds. The use of contact times longer than 6 seconds, though technically feasible, may require unduly large reactor sizes. The contact times may be as short as 0.25 second.

In the conversion of m- and p-xylene to isophthalonitrile and terephthalonitrile generally, the concentration of oxygen in the reaction mixture may vary within wide limits. Generally it is preferred to feed to the reactor a gas mixture containing at least 5% of oxygen, and at least 3 moles of oxygen per mole of xylene. Such a mixture may be, for instance, air or mixtures of air with oxygen. The ratio of ammonia to xylene in the reaction mixture may also vary within wide limits. It is preferred, however, to use between about 1½ and 2 times the theoretical amount of ammonia for the stoichiometric reaction, i. e. about 3 to 4 moles of ammonia per mole of mixed xylenes. Lower or higher proportions of ammonia may be used if desired, but the yields obtained are generally inferior where lower proportions are used and are not substantially increased by the use of higher proportions. The concentration of mixed xylene in the mixture of the reactants is preferably kept low and it is desirable to use concentrations not higher than about 2% by volume of the total gaseous reaction mixture; 1½% by volume is preferred. If higher concentrations than this are used explosive mixtures of xylene and oxygen may be built up. The proportion of meta-xylene to para-xylene in the reaction mixture may vary widely and it will be apparent that the reaction will proceed with 100% meta-xylene, or with 100% para-xylene or with any mixture of the two. The conventional methods for the production of xylenes result in mixtures of the ortho-, meta-, and para-isomers, and while the ortho-isomer can be separated off substantially completely, the production of m-xylene fractions free from p-xylene and of p-xylene fractions free from m-xylene can only be achieved by prolonged and expensive procedures such as fractional crystallisation. Accordingly, commercially available m-xylene and p-xylene contain small proportions of the other isomer. The use of these materials, for instance containing 95% of p-xylene and 5% of m-xylene, in the process of the present invention will result in the production of a product containing about 95% of terephthalonitrile and 5% of isophthalonitrile. From such a product it will be possible to separate most of the terephthalonitrile in a substantially pure form, leaving the isophthalonitrile contaminated with small amounts of terephthalonitrile. Similarly, when using as starting material a mixture of 95% m-xylene and 5% of p-xylene, it will be possible to separate substantially pure isophthalonitrile. Where the starting material consists of a mixture of m- and p-xylene in equal proportions, or where one of the isomers is not present in large excess, it will still be possible to separate one or other of the nitriles in a pure form, but the proportion of that nitrile remaining in solution at the invariant point as an inseparable mixture with the other isomer will be greater. It is therefore preferred to use starting materials containing at least 90% of one isomer.

In the recovery of the dinitriles from the reaction products, the hot gases issuing from the reactor are advantageously cooled to deposit the mixed dinitriles as a white solid. Desirably, traces of m- and p-tolunitriles are then removed by extraction with paraffinic solvents such as petroleum ether, or preferably by distillation methods, for instance steam distillation.

The separation of the isophthalonitrile from the terephthalonitrile is suitably carried out by treating the solid mixture with an organic solvent in which one of the dinitriles, usually the isophthalonitrile, is more soluble than the other. A variety of solvents may be used for this purpose including methanol, ethanol, isopropanol, acetone, methyl ethyl ketone, glacial acetic acid, either as such or in solution in water, ethyl acetate, benzene, xylene, toluene or mixtures thereof. Preferred solvents are xylene, or a hot solution of glacial acetic acid in water, for instance a 50% aqueous solution. The separation may be carried out in a number of different ways, and the choice of any particular method will depend largely on the particular solvent employed and on the proportions of the different dinitriles present. The solvent chosen must be one in which the ratio of solubilities at the invariant point, i. e. the point at which the solvent is saturated with respect to both compounds, differs from the ratio of the two components in the mixture of nitriles, otherwise no separation will be achieved. As is pointed out above, the process of the invention is most suitably applied to mixtures of m- and p-xylenes containing about 90% of one isomer, and in this case the solid mixture of nitriles, in substantially the same proportions, is suitably washed with sufficient solvent to dissolve out all of the component present in the lesser proportion. Alternatively, the reaction product may be completely dissolved in the solvent which is then concentrated to crystallise out the less soluble constituent, generally the terephthalonitrile.

It is generally desirable to carry out the separation at slightly elevated temperatures, for instance between 40° and 120° C., in view of the very low solubility of the two nitriles in most solvents at lower temperatures.

The present invention is further illustrated with reference to the following examples. In the examples all parts are by weight.

*Example 1*

A catalyst was prepared as follows. Activated alumina (8–16 mesh B. S. S.) was heated for approximately 22 hours at 1300° C. One part of powdered vanadium pentoxide was suspended in five parts of distilled water. The suspension was heated to 90° C. and three to four parts of oxalic acid were gradually added until the vanadium pentoxide was completely reduced and dissolved to give a blue solution of vanadyl oxalate. This solution was poured over nine parts of the heat-treated alumina and then evaporated to dryness at about 100° C. with frequent stirring. The product was heated in a stream of air at 380° C. for 16 hours to oxidise the vanadyl oxalate to vanadium oxide. This catalyst contained 10% by weight of vanadium oxide.

The appropriate quantity of catalyst was placed in a U-shaped Pyrex glass tubular reactor, heated by a liquid bath to maintain the catalyst at about 385° C. A preheated mixture of xylene, ammonia and air containing 1.6% by volume of xylene and 6.5% by volume of ammonia was passed through the reactor with a contact time of 6 seconds. The xylene consisted of 90% of the para-isomer and 10% of the meta-isomer. The product gases leaving the reactor were passed into a large air-cooled receiver in which the dinitriles were deposited as a white solid. The product gases contained 75.0% of the mixed dinitrile, <2% of the mixed mono-nitriles, and 9% of carbon dioxide based on the xylene starting material.

After removal of the tolu-nitrile by extraction with petrol ether (B. P. 40–60° C.), the residue of mixed dinitriles was found to contain terephthalonitrile and isophthalonitrile in approximately the same proportions as were the corresponding constituents in the starting materials. Separation was effected as follows:

The mixed nitriles (20 parts by weight) were stirred at 100° C. with a solvent (25 parts) consisting of equal volumes of glacial acetic acid and water. The mixture was filtered while hot, the liquid pressed as completely as possible from the solid cake, and the solid extracted a second time with 50% aqueous acetic acid (20 parts). Concentration of the combined extracts yielded a mixture of isophthalonitrile and terephthalonitrile containing predominantly the former, the quantity of isophthalonitrile extracted being about 70% of the total originally present in the crude nitriles.

The portion of the crude nitriles which was not dissolved by the aqueous acetic acid (consisting almost entirely of terephthalonitrile) was crystallised once from hot aqueous acetic acid or from glacial acetic acid.

Pure terephthalonitrile was obtained, melting at 222° C. (18 parts by weight). The yield of pure terephthalonitrile amounted to 91.7% of the total present in the mixed nitriles. From the mother liquors, an additional quantity (0.9 part) of less pure terephthalonitrile was obtained, M. P. 180–185° C.

*Example 2*

A mixture of p-xylene (90%) and m-xylene (10%) was oxidised in the presence of air and ammonia as described in Example 1, and the product, containing terephthalonitrile (90%) and isophthalonitrile (10%) was separated into its constituents as follows:

The mixed nitriles (100 parts by weight) were stirred at 70° C. with commercial xylene (172 parts by weight) for 30 minutes and the mixture filtered at the same temperature. The residue was again stirred with xylene (85 parts) and filtered. The residual solid consisted of pure terephthalonitrile melting at 221–4° C. The yield was 84.2 parts by weight, representing 93.5% recovery.

Evaporation of xylene from the filtrate left a solid containing principally isophthalonitrile contaminated with terephthalonitrile, which melted at 158–9° C. The yield was 12.9 parts by weight.

*Example 3*

A mixture of p-xylene (90%) and m-xylene (10%) was oxidised in the presence of air and ammonia as described in Example 1, and the product, containing terephthalonitrile (90%) and isophthalonitrile (10%) was separated into its constituents as follows:

The mixed nitriles (100 parts by weight) were stirred under reflux at 65° C. with methanol (100 parts by weight) for 0.5 hour and the mixture filtered while hot. A further portion of methanol was added to the residual solid and the mixture again stirred at 65° C. for 0.5 hour, and then filtered. The residue, after drying in an oven to remove methanol, was almost pure terephthalonitrile, amounting to 82.5 parts by weight.

Evaporation of the combined methanol filtrates yielded a mixture containing 7 parts of terephthalonitrile and 9.5 parts of isophthalonitrile.

The yield of purified terephthalonitrile was 91.7%.

I claim:

1. The process for the production of isophthalonitrile and terephthalonitrile which comprises contacting at an elevated temperature a mixture in the vapour phase of meta-xylene, paraxylene, ammonia and molecular oxygen with a catalyst selected from the group consisting of vanadium oxide and molybdenum oxide to produce a mixture containing isophthalonitrile and terephthalonitrile, and treating the mixture of nitriles with an organic solvent in which one of the nitriles is more soluble than the other to isolate one of the nitriles, said solvent being selected from the group consisting of methanol, ethanol, isopropanol, ethyl acetate, glacial acetic acid, aqueous solutions of glacial acetic acid, benzene, and xylene.

2. The process as claimed in claim 1 wherein the hot gases produced are cooled to deposit the mixed nitriles as a solid.

3. The process as claimed in claim 2 wherein traces of tolunitriles are removed from the mixed nitriles, prior to extraction, by steam distillation.

4. The process as claimed in claim 1 wherein the solvent is a hot 50% aqueous solution of glacial acetic acid in water.

5. The process as claimed in claim 2 wherein the mixture of nitriles produced is completely dissolved in the solvent, which is then concentrated to crystallise out one of the components.

6. The process as claimed in claim 2 wherein the solid mixture is treated with insufficient solvent to dissolve all of the product, whereby only one component is completely dissolved out leaving the other component as a substantially pure solid.

7. The process as claimed in claim 1 wherein the starting material contains one of the isomeric xylenes in excess over the other.

8. The process as claimed in claim 7 wherein the proportion of p- to m-xylene in the starting material is at least 9:1.

9. The process for obtaining isophthalonitrile and terephthalonitrile from a mixture containing the same which comprises treating the mixture of nitriles with an organic solvent in which one of the nitriles is more soluble than the other in order to isolate the more soluble nitrile, said solvent being selected from the group consisting of methanol, ethanol, isopropanol, ethyl acetate, glacial acetic acid, aqueous solutions of glacial acetic acid, benzene and xylene.

10. The process of claim 9, in which the solvent is xylene and the nitrile more soluble therein is isophthalonitrile.

11. The process of claim 9, in which the solvent is a hot 50% aqueous solution of glacial acetic acid and the nitrile more soluble therein is isophthalonitrile.

References Cited in the file of this patent

UNITED STATES PATENTS

| | | |
|---|---|---|
| 2,450,639 | Denton et al. | Oct. 5, 1948 |
| 2,487,298 | Bishop et al. | Nov. 8, 1949 |
| 2,499,055 | Cosby et al. | Feb. 28, 1950 |
| 2,732,399 | Carlston et al. | Jan. 24, 1956 |
| 2,741,633 | McKinnis et al. | Apr. 10, 1956 |
| 2,744,925 | Toland | May 8, 1956 |

OTHER REFERENCES

Mahan et al.: Abstract of application Serial No. 120,606, published June 5, 1951, 647 O. G. 311.